G. ANDERSON.
PAVING BLOCK FOR ROADWAYS AND OTHER SURFACES.
APPLICATION FILED MAR. 19, 1918.

1,285,891.

Patented Nov. 26, 1918.

Witnesses:

Inventor:
George Anderson,
By his Atty,

UNITED STATES PATENT OFFICE.

GEORGE ANDERSON, OF LONDON, ENGLAND.

PAVING-BLOCK FOR ROADWAYS AND OTHER SURFACES.

1,285,891.   Specification of Letters Patent.   Patented Nov. 26, 1918.

Application filed March 19, 1918. Serial No. 223,396.

*To all whom it may concern:*

Be it known that I, GEORGE ANDERSON, a subject of the King of Great Britain, residing in 24, 26, 28, and 30 Duke street, Aldgate, London, E. C. 3, England, have invented certain new and useful Improvements in and Relating to Paving-Blocks for Roadways and other Surfaces, of which the following is a specification.

This invention relates to improvements in paving blocks of the kind forming the subject of British Letters Patent granted to me under No. 105894 in which a rubber faced metal plate is associated with a cement or like body, and it has for its object certain improvements in the means for connecting the metal plate to the cement body.

In the block according to this invention the plate or sheet of metal having thereon the sheet of rubber, is provided with flexible members, which may conveniently be of sheet metal, wire or the like, and which are designed to be embedded in the cement base and so effect the attachment thereto of the metal plate with its rubber surface.

In order that the invention may be the better understood drawings are appended in which:—

Figure 1:
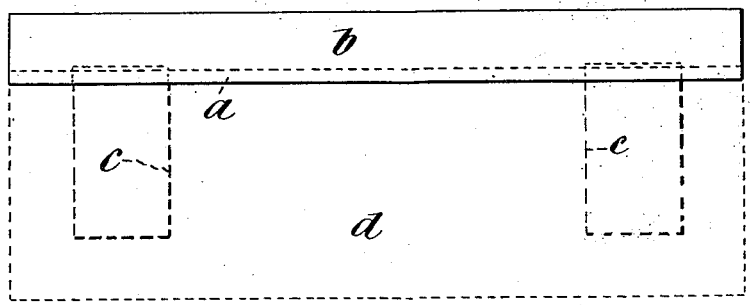
Figure 1 is a side view of a block according to this invention.

Referring to the accompanying drawings $a$ indicates a sheet or plate of iron or other suitable metal and to the outer surface of which there is applied and secured by vulcanizing it thereto, a sheet of rubber $b$ of substantial thickness. The rubber preferably extends along the sides of the plate as shown in the drawings. Disposed upon the upper surface of plate $a$ are the ends of pieces of thin flexible metal $c$ which ends are held in position upon the plate by the layer of harder rubber indicated by the dotted line $b^1$. The pieces $c$ are turned downward in the form of extensions at the sides of the plate $a$ and may be bent or turned in any suitable manner calculated to effect the secure attachment of the block to the cement base $d$, shown in dotted lines in Fig. 1 to which it is applied while the said cement is still soft.

We may under some circumstances dispense with the concrete base $d$ in which case the plate $a$ would be applied directly to a concrete or like surface by embedding the flexible members $c$ therein while the said cement was still in a plastic condition, or the said plates could be supported by cross pieces of wood or other material and the said cement or the like packed thereunder so as to embed the members $c$ therein. By this means the plates could be applied directly to the surface of a road or pathway the cement base being omitted.

Figure 2:
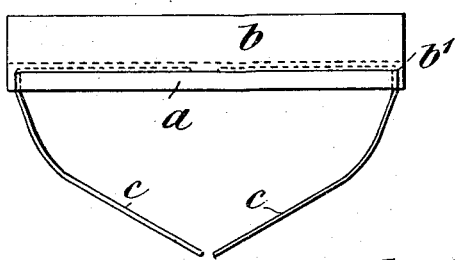
Fig. 2 is an end view of the block with the base removed.
Figure 3:
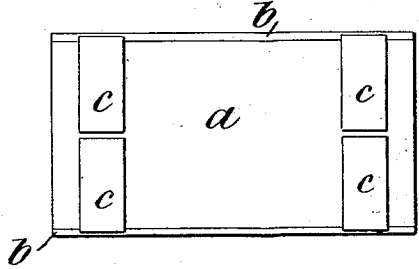
Fig. 3 is a bottom plan view thereof.
Figure 4:
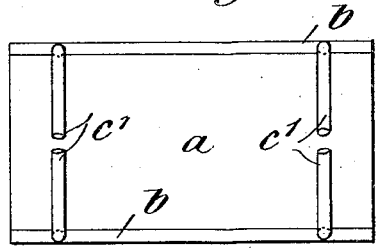
Fig. 4 is a plan of the underside of the metal plate showing an alternative arrangement of the flexible members on the metal plate.

As already explained instead of sheet metal, wire may be employed. Such an arrangement as that just referred to is shown in Fig. 4 where $c^1$ indicate wire bodies applied to the plate $a$ in the manner already explained in connection with Figs. 1 to 3.

Claims:

1. A paving block comprising a sheet of rubber, a metal plate to which said rubber sheet is connected, pairs of flexible metal strips having their upper ends secured between the said plate and sheet and with the other ends of the strips projecting beneath said metal plate, a block of concrete upon which said plate is seated and in which said flexible strips are embedded and down-turned extensions at the sides of said sheet overlying the edges of the plate and strips at the opposite sides of the device.

2. A paving block comprising a sheet of rubber, a metal plate secured to said sheet, flexible strips resting upon the upper surface of the metal plate embedded in the rubber sheet and extending inwardly beneath the plate adapted for embedding in concrete or the like, portions of said rubber sheet depending at opposite sides of the plate over the edges thereof and over the adjacent portions of said strips.

In testimony whereof I affix my signature in the presence of two witnesses.

GEORGE ANDERSON.

Witnesses:
 GEO. WALMSLEY,
 JOHN GREGSON.

Copies of this patent may be obtained for five cents each, by addressing the "Commissioner of Patents, Washington, D. C."